UNITED STATES PATENT OFFICE.

KUNO WOLF, OF BERLIN-CHARLOTTENBURG, GERMANY, ASSIGNOR TO ELEKTRO-OSMOSE AKTIENGESELLSCHAFT (GRAF SCHWERIN GESELLSCHAFT), OF BERLIN, GERMANY, A CORPORATION.

PROCESS FOR MANUFACTURING MATERIAL SUITABLE FOR WALL COVERING, PUTTY, OR THE LIKE.

1,418,896.    Specification of Letters Patent.    Patented June 6, 1922.

No Drawing.    Application filed August 1, 1921. Serial No. 489,077.

*To all whom it may concern:*

Be it known that I, KUNO WOLF, residing at Kantstrasse 85, Berlin-Charlottenburg, Germany, have invented certain new and useful Improvements in a Process for Manufacturing Material Suitable for Wall Covering, Putty or the like (for which I have filed applications in Germany, March 17, 1919; Austria, Sept. 9, 1919; Hungary, Feb. 25, 1920), of which the following is a specification.

The hitherto known processes for the manufacture of magnesia cement may be classed as follows:

1. Processes yielding a chloridic cement,
2. Processes yielding a cement free from chloride, and
3. Processes in which, in the place of calcined magnesite, a calcined artificial magnesite is employed as a basic element for the cement.

Now it is well known that articles formed of a magnesia cement of this kind are not weather proof but rather crack, swell up, and in some cases instead of becoming harder, turn softer and softer. As an attendant phenomenon of the physical change taking place within said mass, an efflorescence is formed on the surface thereof. Thus, for instance, the cement known as Sorel cement, an aqueous magnesium oxychloride, embodies the undesirable property of being apt to be decomposed by water, and that rapidly by means of hot water, and slowly by cold water; even at a temperature of 30° C. fissures make their appearance.

Now by means of this present invention, with the addition, it may be, of filling substances, there is the possibility of producing out of magnesite and a lye of chloride of magnesium a material suitable for wall coverings, glazier's putty or similar purposes.

The invention is based on the recognition that the magnesium oxide obtained on the decomposition of combinations of magnesium, such for example as $MgCO_3$, $Mg(NO_3)_2$, $Mg(OH)_2$, will always, chemically considered, correspond to the formula MgO, but from a physical chemical viewpoint will be different according to the initial conditions existing in each case. Thus, for example, the MgO derived from $MgCO_3$, is a white, amorphous mass, while the MgO derived from $Mg(NO_3)_2$, shows a firm granulous structure. As a result of the varying density of the mass, which differs according to the particular nature of the mass started with, there are created conditions which, owing to the diverse surface formation, will also in the course of the subsequent chemical-physical transformation with aid of a solution of chloride of magnesium yield, from case to case, different final products. The fact is that these are colloid-chemical conditions which crop up in the various stages of condensation.

It has further been discovered, that in the production of MgO, as a base for a magnesium cement, the action of the temperature plays a very important part. For while powerfully glowed $MgCO_3$ will yield MgO which combined with $H_2O$ will pass over exceedingly slowly into $Mg(OH)_2$, this transformation will take place at a far greater speed, provided the $MgCO_3$ has been but gently glowed. As for the $Mg(OH)_2$ for its part being thereupon gently glowed there will arise an MgO which, in its physical-chemical nature will considerably differ from that originally obtained. The conditions will be found to be analogous on starting with a condensed magnesite—which, as known, is a typical gel.

Based on the results thus gained by experience, and with the view to obtaining a useful MgO, and one always capable of reproduction, in full accordance with this present invention, the method resorted to consists in condensed magnesite being weakly or gently glowed, dry slaking the same after it has cooled down, and then re-calcining it afresh. It will be found expedient to affect the first glowing operation of the magnesite at a temperature of from 600—700° C., and the second at about 800° C. It has already been proposed to render glowed magnesia of but little reactive capacity particularly capable of reaction by first slaking the same and then again subjecting it to calcination. In contradiction hereto, and subject to this invention, highly reactive magnesia after having been submitted to a glowing operation is rendered less reactive by dry slaking and re-calcination.

However, also as regards the employ of lye of chloride of magnesium in combination with magnesite, the present invention reposes on entirely novel discoveries, since it has been found that for the production of a magnesite cement use cannot be immediately made of a lye of chloride of magnesium, that is to say of a solution of $MgCl_2 \cdot 6(H_2O)$, in water, but only of such a lye of chloride of magnesium which in addition contains $Mg(OH)_2$ and $Mg\frac{OH}{Cl}$ in colloidal distribution. The intensity of the concentration of said lye of chloride of magnesium has been found to be of vast importance for the production of a cement of chloride of magnesium. In accordance with my invention, crystallized chloride of magnesium is dissolved in water, and thereupon boiled until an intensely concentrated lye of magnesium of about 36° Bé. or more is produced, which is then filtered.

It thus follows that the novel process of obtaining a material suitable alike as a wall covering for glazier's putty, or the like, essentially consists, on the one hand, in condensed magnesite being weakly glowed preferably at a temperature of 600 to 700° C., being dry slaked after having cooled down, and the product thus obtained being preferably calcined at a temperature of 800° C., then ground and strained. On the other hand, crystallized aqueous chloride of magnesium is dissolved in water and boiled for a length of time sufficient until the filtrate possesses a density of about 36° Bé. or more, whereupon it is filtered. The two products thus obtained, namely the oxide of magnesium and the magnesium lye, are then mixed until a homogeneous plastic mass has formed.

The respective proportions of lye and oxide of magnesium may, for instance, be so chosen, that 60 gr. of lye of chloride of magnesium of 36.2° Bé. are mixed with 40 gr. of oxide of magnesium. This mass which is subjected to hardening for about 18 to 20 hrs., will prove durable, and will constitute either per se or else in combination with a filling material such as clay, kieselguhr, etc. a substance suitable for manifold purposes, say, as wall covering, glazier's putty, cutler's lute, and the like. In the case of the addition of filling materials then, subject to the present invention, such substances only must be added, which are in a thoroughly purified colloidal state. The employ of colloidal filling materials, which is known per se secures to the present improved process the benefit that the advantages gained will also be retained to a high degree on adding filling materials. On employing other filling materials, there will be produced substances which are not weather proof, and which crack, and effloresce, because the materials added are not in the state of disintegration required for the colloidal-chemical processes taking place during the hardening operation.

Having now fully set forth and ascertained the nature of my invention, and the particular purpose for which it is destined, what I claim is:

1. In a process of manufacturing material suitable for wall covering, putty and the like, the following steps: Weakly glowing condensed magnesite, dry slaking the same after cooling and then calcining the resulting product; dissolving crystallized chloride of magnesium in water, boiling until an intensely concentrated solution has formed and then filtering said solution; finally mixing the two products resulting, that is, the oxide of magnesium and the magnesium chloride solution.

2. In a process of manufacturing material suitable for wall covering, putty and the like, the following steps: glowing condensed magnesite at a temperature of from 600 to 700° C., dry slaking the same after cooling and then glowing the product at about 800° C.; dissolving crystallized chloride of magnesium in water and then concentrating the solution to about 30° Bé. or more; finally, mixing the oxide of magnesium and the magnesium chloride solution.

3. In a process of manufacturing material suitable for wall covering, putty and the like, the following steps: subjecting condensed magnesite to a glowing operation and after cooling dry slaking and then calcining the same; dissolving magnesium chloride in water and then boiling and concentrating the same; mixing the oxide of magnesium and magnesium chloride solution thus obtained, and adding thoroughly purified colloidal substances as filling materials to the mixture.

In testimony whereof I affix my signature in presence of two witnesses.

KUNO WOLF.

Witnesses:
 Dr. EGAN LANGSTER,
 MAX ANDERS.